May 14, 1968   J. L. SOLOMON   3,383,492
OPTICAL VIEWING SYSTEM FOR ELECTRON BEAM WELDERS
Filed June 23, 1964   2 Sheets-Sheet 2
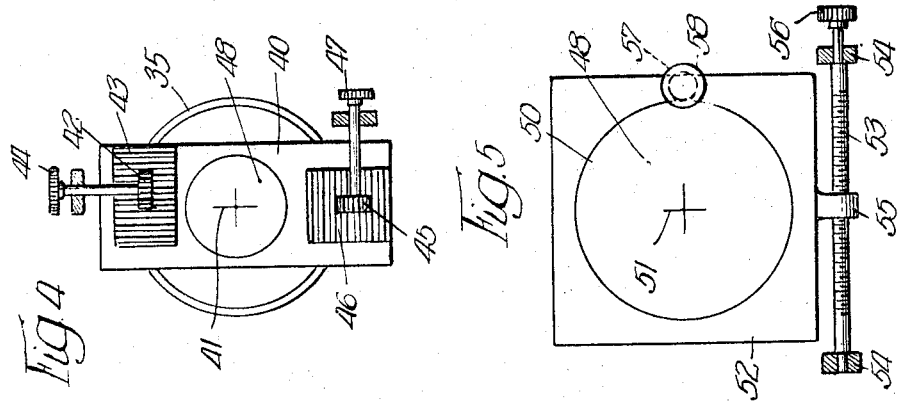
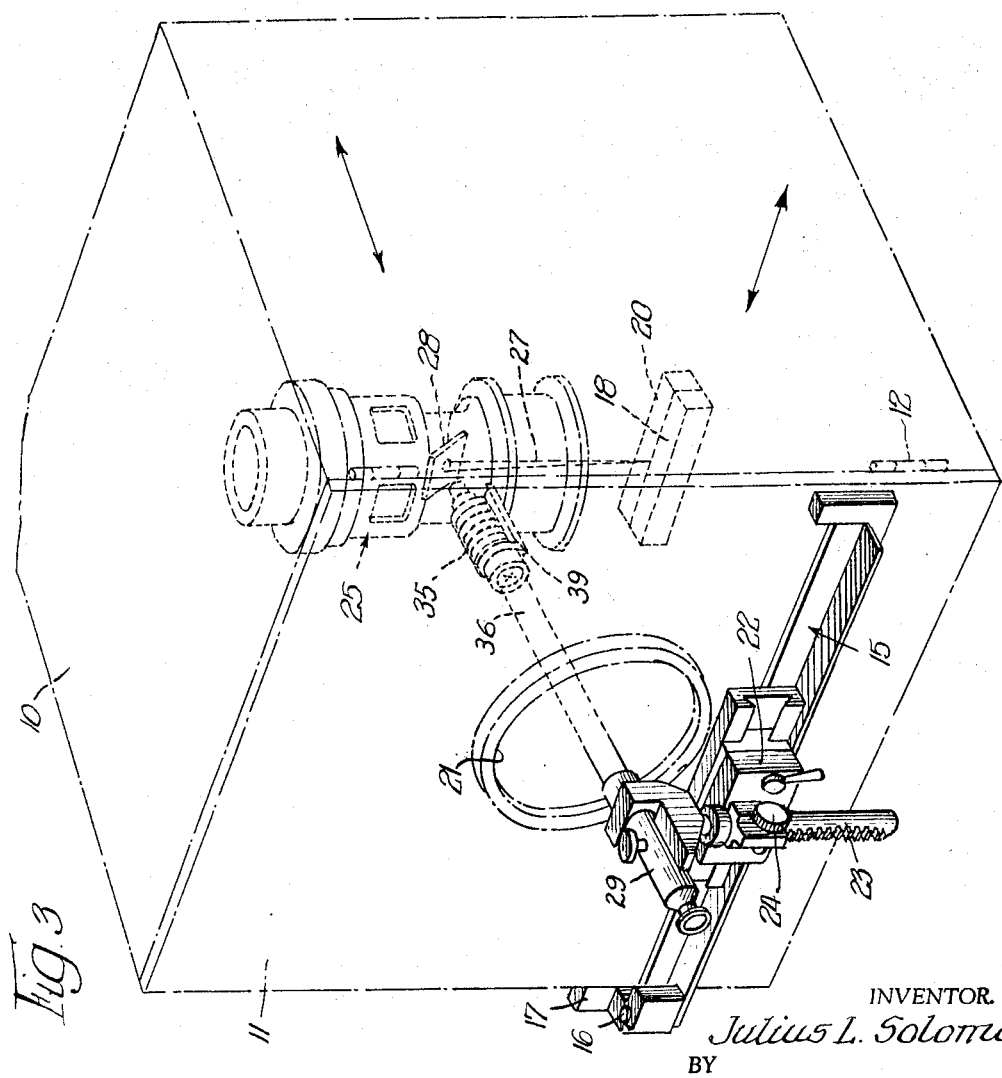
INVENTOR.
Julius L. Solomon,
BY
Hume Groen Clement & Hume
Attys 3,383,492
Patented May 14, 1968

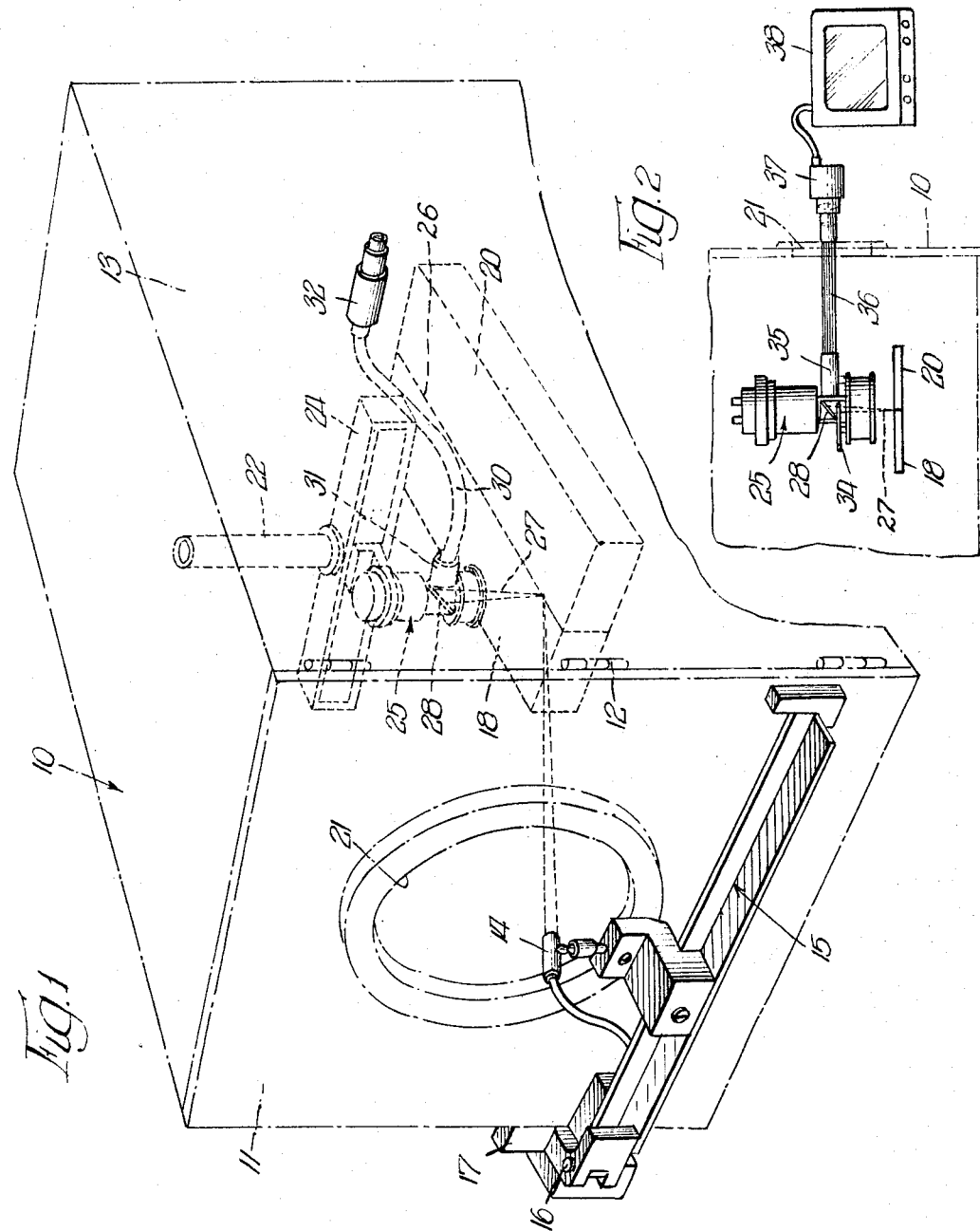

3,383,492
OPTICAL VIEWING SYSTEM FOR ELECTRON BEAM WELDERS
Julius L. Solomon, Chicago, Ill., assignor to Welding Research, Inc., Chicago, Ill., a corporation of Illinois
Filed June 23, 1964, Ser. No. 377,307
5 Claims. (Cl. 219—121)

ABSTRACT OF THE DISCLOSURE

In an electron beam welding apparatus, in combination, an electron beam gun being mounted within a vacuum chamber for adjustable movement in both vertical and horizontal directions, a workpiece providing a seam to be welded, said workpiece also being located within the vacuum chamber and being supported for movement horizontally in a direction parallel to the seam, an optical system for viewing the seam from outside the vacuum chamber before, during and following the welding operations, said optical system including a collimator lens fixed to and movable with the gun and a viewing telescope located exteriorly of and supported by the vacuum chamber, a cross hair reticule mounted at the image plane of the lens and which is capable of adjustment with respect to the image projected by the lens, and means supporting said telescope adjacent a window of the vacuum chamber and in a manner permitting adjustment of the telescope with respect to the image end of the lens.

---

The invention relates to the art of welding within a vacuum chamber by electron beam guns, and has reference in particular to an optical system for viewing the workpieces from outside the vacuum chamber during the welding operations.

When an electron gun is employed in the welding of metals, the operation is carried out in a sealed chamber under a high vacuum. The workpieces are generally supported within the chamber on a carriage adapted to have movement in the direction of the seam to be welded. The gun is also supported within the chamber by a separate and independent carriage mounted for transverse movement in a direction at right angles to the seam to be welded. It is, therefore, necessary to provide accurate and reliable means for correlating the electron beam gun with the seam to be welded and in a manner which will enable the operator to view the welding operations from outside the chamber.

In view of the foregoing an object of the invention is to provide an optical system for electron beam guns which will enable the operator to conveniently view the workpieces to be welded from a position outside the vacuum chamber and wherein the other terminal of the optical system is located on the gun and is movable with the gun.

Another and more specific object is to provide an optical viewing system for electron beam welders which will employ means in the form of a flexible fiberscope for transmitting the image of the workpieces to outside the vacuum chamber. The flexible glass fibers of a fiberscope are systematically arranged into a bundle and they transmit an image which remains undisturbed when the bundle is bent. Accordingly the fiberscope permits movement of the gun and thus accurate tracking of the seam being welded during the welding operations.

Another object of the invention is to provide an optical arrangement having utility for the purposes described wherein a spot viewed on the workpieces is projected by means of a conventional lens system carried by the gun to the image end of the lens system and wherein the image end of the lens system has associated therewith an adjustable glass slide providing a cross hair reticule for correlation with a selected spot on the projected image. In this improved form of lens system the cross hair reticule is carried by the gun and accordingly no matter where the gun may be moved, it is only necessary for the operator to view the cross hair in order to locate the start of the weld with precision.

With these and various other objects in view the invention may consist of certain novel features of construction and operation, as will be more fully described and particularly pointed out in the specification, drawings and claims appended thereto.

In the drawings which illustrate an embodiment of the device and wherein like reference characters are used to designate like parts:

FIGURE 1 is a perspective view showing one optical system coming within the invention applied to a vacuum chamber housing, the electron gun and the workpieces to be welded;

FIGURE 2 is a fragmentary view showing an additional optical system for an electron beam gun in a vacuum chamber and which additionally illustrates the combination therewith of a television pick-up tube and television monitor on which the image of the workpieces may be viewed;

FIGURE 3 is a perspective view similar to FIGURE 1 but showing a lens system attached to the electron gun, the same having associated therewith an adjustable plate providing a cross hair reticule; and FIGURES 4 and 5 are detail views illustrating preferred structure for adjustably mounting a cross hair reticule at the image plane of a lens system such as shown in FIGURE 3.

In FIGURE 1 the vacuum chamber is diagrammatically illustrated by dotted lines as a rectangularly shaped enclosure 10 having a front door 11 hinged at 12 to the right hand side wall 13 of the chamber. The light source 14 is adjustably carried by the structure 15 which is pivotally secured at 16 to a bracket 17 fixed to the left hand side wall of the vacuum chamber. The pivot mounting of the unitary structure 15 provides for swinging movement of the structure independently of the door 11. Also, it will be observed that whereas the door is provided with the hinges 12 at the right hand side, the said structure 15 is pivotally secured to the left hand side of the chamber. Thus when the door is open for placing and adjusting the workpieces 18 and 20 within the vacuum chamber, the structure 15 can be swung into a front position whereby to locate the light source 14 for illuminating the workpieces thereby facilitating the positioning of the same. Also, when the door 11 is closed for evacuating the chamber the structure 15 is likewise operative since the same can be rotated into the position as shown in FIGURE 1 so that the light source 14 is available for projecting a light beam through the circular glass window or port 21 for illuminating the welding area during the welding operation.

The depending support 22 is capable of vertical up and down movement and the member 24 supports the gun 25 for movement in a horizontal transverse direction. The workpieces 18 and 20 to be welded along the seam 26 are also suitably supported within the vacuum chamber 10 by carriage structure, not shown, but which provides for movement of the workpieces in a longitudinal direction. For a more particular description of the carriage structures for mounting the electron gun, and for supporting the workpieces reference is made to the Sciaky Patent 3,112,391 for a Zeroing System for Electron Guns granted Nov. 26, 1963.

The electron beam 27 projected by the gun 25 passes through an opening provided for the same in the diagonal mirror 28 and at a point of maximum density the beam impinges on the workpieces for welding along the seam 26. In order that the operator may view the welding operation, the invention provides a flexible fiberscope 30. The end 31 of the fiberscope is fixed to the gun in front of the mirror 28. The viewing end 32 of the fiberscope extends through the side wall 13 to project exteriorly of the wall and said projecting end is suitably sealed to prevent the entrance of air into the vacuum chamber.

The fiberscope essentially consists of a bundle of flexible glass or plastic fibers coherently oriented so that an image may be transmitted from one end of the element to the other. Surface scratches and contamination on the surfaces of the fibers permit loss of light so that in time the attenuation in the fibers becomes unacceptably high. To overcome this difficulty a transparent cladding is applied to each individual fiber, the same having a low refractive index. In practice a fiber diameter of about fifty microns (0.002 inch) is generally employed and wherein the cladding occupies about twenty percent of the total cross sectional area. Standard fiberscopes are protected by an outer flexible sheath generally of stainless steel and a photographic objective is provided at end 31 for casting an image at this end of the fiber bundle. At end 32 an eye piece is employed for viewing the image with some magnification.

The flexibility of the fiberscope renders it possible for the end 31 to be fixed to the electron gun and to have movement with the gun, whereas the viewing end 32 of the fiberscope is stationary, having a fixed and sealed position in the wall 13 of the chamber. Thus the operator is able to view the welding operation at all times and although the body of the fiberscope has some movement along with the gun, this does not disturb the transmitted image as viewed by the operator.

In the modified form of the invention shown in FIGURE 2 the image of the weld area is focused on a television pick-up tube and displayed on a television monitor. However, it will be understood that the weld area could be viewed directly by using a telescope, or a flexible fiberscope could be employed as explained in connection with FIGURE 1. The electron gun 25 employs a diagonal reflecting mirror 28 and the electron beam is projected through a central opening provided in the mirror, all as previously described. In this modification a rotatable glass masking shield 34 is added, the same having the proper location below the mirror and a further element, namely a collimator lens 35 is positioned in front of the mirror. The collimator lens is capable of projecting a beam of parallel light rays and in accordance with the invention the said lens 35 is so oriented as to project the parallel bundle of light rays designated by numeral 36 in a lateral horizontal direction towards the window or port 21.

Exteriorly of the window a telescope could be positioned for a direct view of the image as projected and collimated by the lens 35. However, in order to illustrate an additional feature of the invention, FIGURE 2 shows a television pick-up tube 37 and a television monitor 38 in an electrical connection with the pick-up tube. Thus, the welding operation on the workpieces 18 and 20 taking place within the vacuum chamber 10 can be conveniently viewed by the operator on the television monitor and with desirable magnification.

The electron gun 25 shown in FIGURE 3 is suitably supported within the vacuum chamber 10 by carriage structure, not shown. Said structure provides for movement of the gun towards and from the front door, or in other words, in the direction of the arrows as shown. The workpieces 18 and 20 are also supported for bodily movement but in a direction transverse, that is, at right angles to the direction of movement of the gun. The door 11 is hinged at 12 and the telescope 29 is carried by the bracket structure 15 which is pivotally secured at 16 to the fixed supporting member 17. The pivot mounting 16 for the bracket structure 15 permits swinging movement of the bracket on a pivot axis at the side opposite the hinging of the door. Thus the bracket 15 has swinging movement independently of the door and the same may be operatively positioned when the door is open as well as when the door is closed as in FIGURE 3.

In this modification it is desirable that the telescope 29 have an adjustable mounting on the bracket structure 15. Accordingly, the slide 22 is provided, the same permitting movement of the telescope in a horizontal direction with respect to the window 21. The vertical mounting is effected by the rack 23 and vertical adjustment is produced by manipulation of the knob 24.

The reflecting mirror 28 of electron beam gun is positioned at a diagonal angle of approximately 45° so as to image the welding area, and said mirror is provided with a central opening to permit the electron beam generated by the gun to pass through the mirror. The collimator lens 35 is carried by the gun, since it is supported by the bracket 39. The lens is precisely located in front of the mirror for viewing the virtual image in the mirror, and the said lens is also located in alignment with the window or port 21. A cross hair reticule is carried by the lens system of 35 and said reticule is adjustable from outside the lens with respect to the image, the adjustment means for the same being illustrated in FIGURES 4 and 5. In this manner the cross hairs and the image move together as a unit and they retain exact coincidence regardless of the gun position. The external telescope 29 will magnify the cross hairs and the image as projected by the lens 35 and thus the magnified image of the cross hairs and the work surface is carried to the eye of the operator. Alignment is not critical since the lens 35 will not at any time leave the field of view of the microscope.

The optical systems as illustrated and described have a number of distinct objectives. By viewing the weld area the operator is able to determine whether the seam 26 is mechanically aligned parallel to a theoretical center line represented by the axis of the gun motion or by the axis of the work carriage motion. It also enables the operator to see directly into holes or restricted locations in the workpieces which may not be visible from an angular line of sight outside the chamber. In addition the weld can be inspected both during and following the welding operation. The lens system and reticule as shown in FIGURE 3 is additionally useful for indicating the point of beam impingement on the work surface.

For calibrating the gun before a welding operation is begun, the chamber is evacuated and the gun 25 is energized momentarily so as to produce a spot on a piece of scrap metal placed on one end of the workpieces. The spot is then viewed through the telescope 29 and the reticule is adjusted to precisely align the cross hairs with the spot. The gun or the work may then be positioned by movement of the same until the cross hairs as viewed through the telescope are directly over the point at which the welding is to be started. Since the position of the cross hairs indicates the point of beam impingement, it is only necessary to view the cross hairs through the telescope in order to position the start of the weld with precision.

After the initial spot weld is formed on the scrap metal the operator adjusts the cross hair reticule so as to align the same therewith. The adjustment is effected exteriorly of the lens system 35 by means such as shown in FIGURES 4 and 5. By suitable electric control elements the adjusting structure can be rendered operative from outside the vacuum chamber. In FIGURE 4 the lens 35 has suitably associated therewith the reticule in the form of a transparent plate 40 approximately rectangular in shape and which is disposed in axial alignment with the lens system of 35. The cross hairs 41 are located approximately centrally of the transparent plate 40 and horizontal and vertical racks are suitably fixed to one surface of the plate. The pinion 42 has meshing relation with the horizontal rack 43, and the pinion can be rotated by manipulation of the finger piece 44. As a result of such manipulation the cross hair reticule 40 may be adjusted in a direction horizontally of the image. The pinion 45 has meshing relation with the vertical rack 46 and thus the reticule 40 may be adjusted vertically by manipulation of the finger piece 47.

The spot weld produced on the scrap metal may appear in the image as viewed by the telescope 29 as a dot such as indicated by numeral 48. It will be readily understood that the cross hairs 41 can be precisely aligned with the said dot 48 by proper adjustment of reticule 40, which merely requires manipulation as described for effecting movement of the plate 40 both vertically and horizontally.

In FIGURE 5 the reticule 50 consists of a circular transparent plate having the cross hairs 51 and which is carried by the member 52 so as to rotate. The threaded shaft 33 is journalled by the bearings 54 forming part of the lens 35. The boss 55 depends from the member 52 and the same has threaded relation with the shaft. Thus by rotation of the finger piece 56, the member 52 as a unit can be adjusted horizontally. The member 52 additionally carries the gear or friction wheel 57 which is rotatable by manipulation of the finger piece 58. Since the circular part 50 of the member 52 is rotatable it will be appreciated that the desired rotation of the same either clockwise or counterclockwise can be effected by rotation of 57.

The invention is not to be limited to or by details of construction of the particular embodiment thereof illustrated by the drawings as various other forms of the device will, of course, be apparent to those skilled in the art without departing from the spirit of the invention or the scope of the claims.

I claim:

1. In welding apparatus, in combination, an electron beam gun, a vacuum chamber within which said gun is mounted for adjustable movement in both vertical and horizontal directions, a workpiece providing a seam to be welded, said workpiece also being located within said vacuum chamber and being supported for movement horizontally in a direction parallel to the seam, of an optical system for viewing the seam from outside the vacuum chamber before, during and following the welding operations, said system including a collimator lens fixed to the gun and a telescope located exteriorly of the vacuum chamber, said telescope having a position adjacent a window of the vacuum chamber and being so oriented as to view the image projected by the collimator lens.

2. In welding apparatus as defined by claim 1 additionally including a mirror carried by the gun at an angle of approximately forty-five degrees and having an aperture therein whereby to permit the passage of the electron beam projected by the gun during the welding operations, wherein the said collimator lens is fixed to the gun directly in front of the mirror, whereby this element of the optical system is movable with the gun and is positioned for projecting the virtual image as seen in the mirror, and wherein the telescope is supported exteriorly of the vacuum chamber for adjustment with respect to the image end of the said collimator lens.

3. In welding apparatus, in combination, an electron beam gun having a location within a vacuum chamber and being mounted for adjustable movement in both vertical and horizontal directions, a workpiece providing a seam to be welded, said workpiece also being located within the vacuum chamber and being supported for movement horizontally in a direction parallel to the seam, of an optical system for viewing the seam from outside the vacuum chamber before, during and following the welding operations, said optical system including a collimator lens fixed to and movable with the gun and a viewing telescope located exteriorly of and supported by the vacuum chamber, a cross hair reticule mounted at the image plane of the lens and which is capable of adjustment with respect to the image projected by the lens, and means supporting said telescope adjacent a window of the vacuum chamber and in a manner permitting adjustment of the telescope with respect to the image end of the lens.

4. In welding apparatus as defined in claim 3, additionally including a mirror carried by the gun at an angle of approximately forty-five degrees and having an aperture therein whereby to permit the passage of the electron beam projected by the gun during the welding operations, wherein said lens is fixed to the gun directly in front of the mirror for transmitting to the telescope the image as reflected by the mirror, and wherein said lens is of the collimator type.

5. In a welding method for an electron beam gun having location within a vacuum chamber for welding metal workpieces also located within the vacuum chamber, said electron beam gun having fixed thereto a lens element providing an adjustable cross-hair reticule, the steps which include viewing the image of the workpieces as projected by the lens element by means of a telescope located outside the vacuum chamber, whereby the seam to be welded for joining the workpieces can be visually inspected before, during and following the welding operations, momentarily energizing the gun to produce a spot weld on a metal piece located within the chamber in associated relation with the workpieces, noting the location of the spot weld in the projected image and adjusting the reticule to precisely position the cross-hairs on the said spot, thereby obtaining information as to the position of the electron beam where it impinges upon the work within the chamber, moving the gun with respect to the workpieces to align the cross-hairs with the seam to be welded, and then energizing the gun to effect the welding operation.

References Cited

UNITED STATES PATENTS

| | | | |
|---|---|---|---|
| 3,020,389 | 2/1962 | Gorman | 219—72 |
| 3,112,391 | 11/1963 | Sciaky | 219—124 |
| 3,156,809 | 11/1964 | Stearns | 219—121 |
| 3,156,810 | 11/1964 | Samuelson | 219—121 |
| 3,169,183 | 2/1965 | Radtke et al. | 219—121 |
| 3,275,795 | 9/1966 | Bosna et al. | 219—125 |
| 3,291,959 | 12/1966 | Schleich et al. | 219—121 |
| 3,300,618 | 1/1967 | Sciaky | 219—121 |

RICHARD M. WOOD, *Primary Examiner.*

W. D. BROOKS, *Assistant Examiner.*